United States Patent [19]
Takaya et al.

[11] Patent Number: 5,497,327
[45] Date of Patent: Mar. 5, 1996

[54] CONTROL SYSTEM FOR OCCUPANT RESTRAINT SYSTEM

[75] Inventors: Seizi Takaya; Shuzo Fukuzumi, both of Zama; Hiroaki Ohbayashi, Isehara; Makoto Kimura, Sagamihara, all of Japan

[73] Assignee: Nissan Motor Co., Ltd., Yokohama, Japan

[21] Appl. No.: 288,741

[22] Filed: Aug. 16, 1994

[30] Foreign Application Priority Data

Sep. 7, 1993 [JP] Japan ................................ 5-222477

[51] Int. Cl.⁶ .................................................... B60R 21/32
[52] U.S. Cl. .................. 364/424.05; 340/436; 307/10.1; 280/735; 180/282
[58] Field of Search ...................... 364/424.05; 340/436, 340/669; 280/734, 735; 180/274, 282; 307/10.1

[56] References Cited

U.S. PATENT DOCUMENTS

| | | | |
|---|---|---|---|
| 4,410,875 | 10/1983 | Spies et al. | 280/735 |
| 5,021,678 | 6/1991 | Diller | 307/10.1 |
| 5,065,322 | 11/1991 | Mazur et al. | 364/424.05 |
| 5,081,587 | 1/1992 | Okano | 364/424.05 |
| 5,109,341 | 4/1992 | Blackburn et al. | 364/424.05 |
| 5,157,268 | 10/1992 | Spies et al. | 307/10.1 |
| 5,173,614 | 12/1992 | Woehrl et al. | 307/10.1 |
| 5,182,459 | 1/1993 | Okano et al. | 307/10.1 |
| 5,189,311 | 2/1993 | Moriyama et al. | 364/424.05 |
| 5,229,943 | 7/1993 | Eigler et al. | 364/424.05 |
| 5,256,904 | 10/1993 | Tohbaru | 307/10.1 |
| 5,285,187 | 2/1994 | Hirao et al. | 340/436 |
| 5,339,242 | 8/1994 | Reid et al. | 364/424.05 |
| 5,363,302 | 11/1994 | Allen et al. | 364/424.05 |

FOREIGN PATENT DOCUMENTS 4-503339  6/1992  Japan.

OTHER PUBLICATIONS

Freund & Wilson, "Statistical Methods" HBJ, 1993.
Moharty, "Random Signals Estimation & Identification", Van Nostrand Reinhold, 1986.

Primary Examiner—Kevin J. Teska
Assistant Examiner—Tyrone V. Walker
Attorney, Agent, or Firm—Lowe, Price, LeBlanc & Becker

[57] ABSTRACT

A control system for an occupant restraint system for protecting a vehicle occupant in a vehicle collision. The control system comprises a vehicle deceleration sensor and a microcomputer which is programmed as follows: Integration of a vehicle deceleration from the deceleration sensor is initiated to obtain the integrated value when the deceleration exceeds a threshold level. Additionally, a time (duration) is timed until the integrated value exceeds a threshold value. Then, an operating timing of the occupant restraint system is determined, while necessity of operation of the occupant restraint system is decided in accordance with the vehicle deceleration. When the necessity of the occupant restraint system operation is decided, the occupant restraint system is operated at the above-mentioned operation timing.

7 Claims, 9 Drawing Sheets

CONTROL SYSTEM FOR OCCUPANT RESTRAINT SYSTEM

BACKGROUND OF THE INVENTION

1. Field of the Invention

This invention relates to improvements in a control system for an occupant restraint system arranged to protect a vehicle occupant in the event of a vehicle collision.

2. Description of the Prior Art

A variety of control systems for an occupant restraint system have been proposed and put into practical use in the field of automotive vehicle. The occupant restraint system includes an airbag and/or a seat belt assembly to protect a vehicle occupant from coming into direct contact with a steering wheel and/or a windshield. One of typical control systems is disclosed in Japanese Patent Provisional Publication No. 4-50333 and arranged to operate the occupant restraint system to protect the vehicle occupant when an integrated value has reached a predetermined threshold value, the integrated value being obtained by integrating a deceleration of the vehicle detected by a deceleration sensor.

Figure 10:
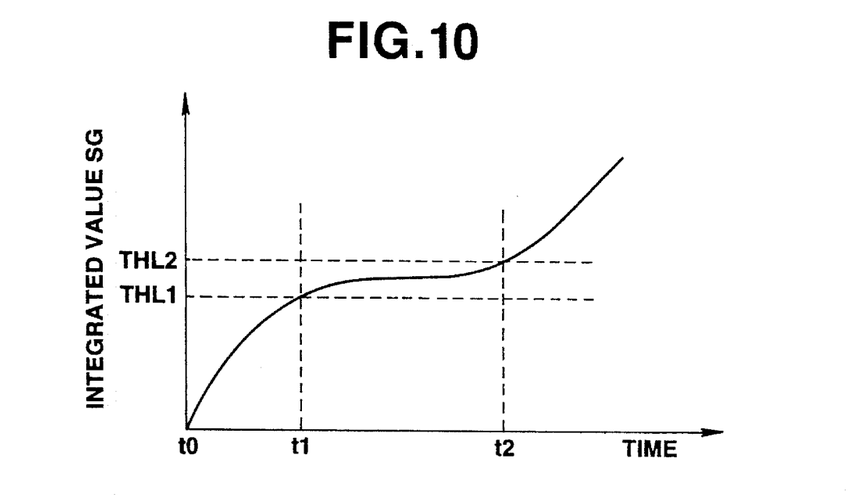
FIG. 10 is a graph showing a change in integrated value SG of the deceleration g in a vehicle collision, in terms of lapsed time, used in a conventional control system of an occupant restraint system.

There are various kinds of vehicle collision modes. Examples of them are shown in FIG. 10 which illustrates a change in integrated value SG of a deceleration g in a vehicle collision. In the graph of FIG. 10, t0 indicates a timing at which the deceleration g exceeds a predetermined threshold value. This threshold value is provided to distinguish a vehicle collision from normal vehicle movements. Accordingly, there is a high possibility of occurrence of a vehicle collision when the deceleration g exceeds this threshold value, and therefore measurement and integration of the deceleration g is initiated from the timing t0.

In general, the integrated value SG of the deceleration g after initiation of the vehicle collision tends to first suddenly increase, then become generally constant, and thereafter again increase as shown in FIG. 10.

Now, the occupant restraint system is usually operated during a time period (t1 to t2) in which the integrated value SG of the deceleration g is generally constant. However, during such a period, the amount of change in the integrated value SG is considerably small as apparent from FIG. 10, and therefore it is required to precisely set threshold values THL1 and THL2. As a result, many troublesome adjustment operations are necessary for the control system.

SUMMARY OF THE INVENTION

It is an object of the present invention to provide an improved control system for an occupant restraint system, which can effectively overcome the drawbacks encountered in conventional control systems for an occupant restraint system.

Another object of the present invention to provide an improved control system for an occupant restraint system, which can be largely reduced in adjustment operations for the control system to effectively operate the occupant restraint system at a necessary timing.

A further object of the present invention to provide an improved control system for an occupant restraint system, in which the timing of operation of the occupant restraint system can be accurately set with simple adjustmentsss even in case that the operation of the occupant restraint system is made during a time period at which the integrated value of a deceleration is generally constant.

Figure 1:
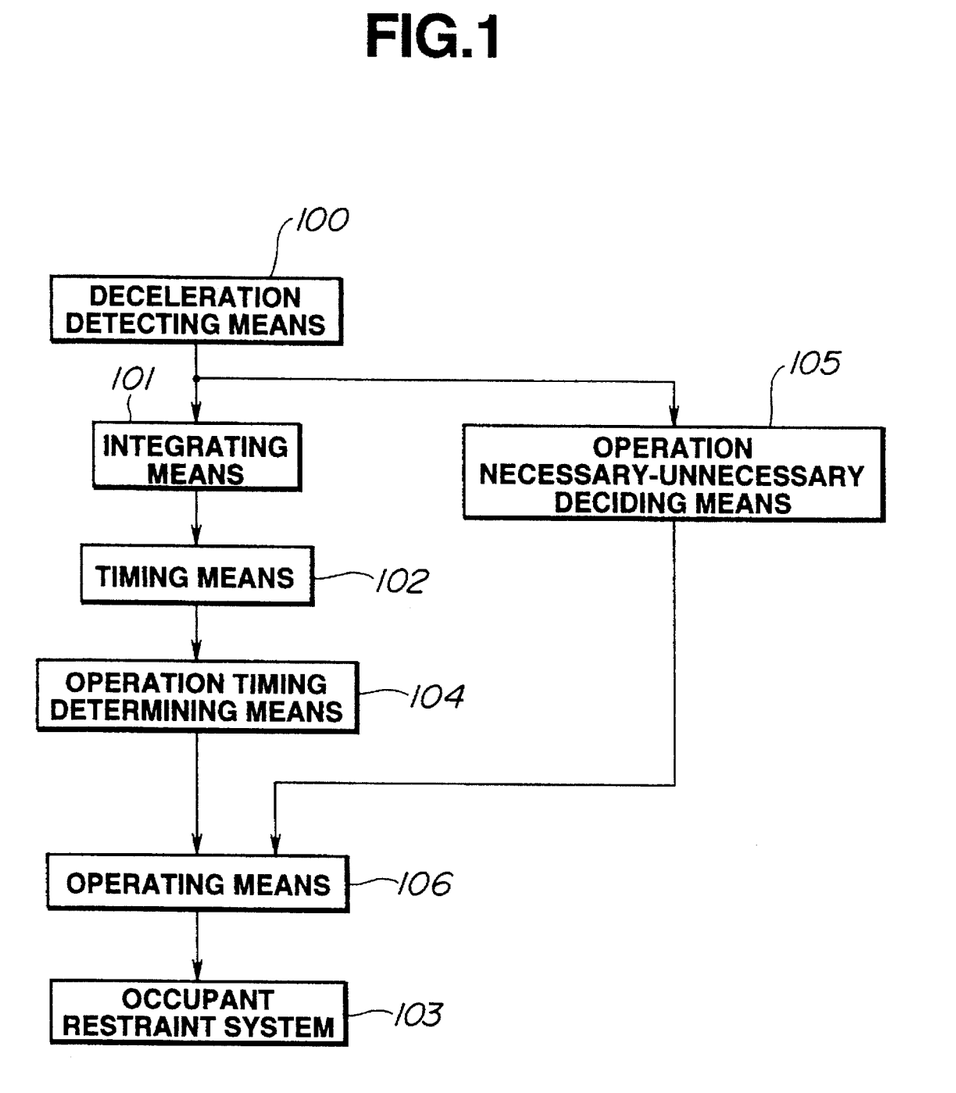
FIG. 1 is a block diagram showing the principle of a control system for an occupant restraint system, according to the present invention.

A control system for an occupant restraint system 103, according to the present invention is illustrated in principle in FIG. 1 and comprises deceleration detecting means 100 adapted to detect a deceleration of the vehicle. Integrating means 101 is provided to initiate integration of the deceleration to obtain an integrated value when the deceleration exceeds a predetermined threshold value. Timing means 102 is provided to time a time (duration) which is from a timing of initiation of the integration of the deceleration to a timing of the integrated value exceeding the threshold value. Operation timing determining means is provided to determine an operation timing of the occupant restraint system in accordance with the time timed by the timing means. Operation necessary-unnecessary deciding means 105 is provided to decide necessity of operation of the occupant restraint system in accordance with the deceleration detected by said deceleration detecting means. Additionally, operating means 106 is provided to operate the occupant restraint system at the operation timing determined by the operation timing determining means in response to the necessity of operation decided by the operation necessary-unnecessary deciding means.

With the thus arranged control system, integration of the deceleration of the vehicle is initiated to obtain the integrated value when the deceleration exceeds the threshold level. Additionally, the time (duration) is timed until the integrated value exceeds the threshold value. Then, the operating timing of the occupant restraint system is determined, while the necessity of operation of the occupant restraint system is decided in accordance with the deceleration of the vehicle. When the necessity of the occupant restraint system operation is decided, the occupant restraint system is operated at the above-mentioned operation timing. Therefore, the operation timing of the occupant restraint system can be accurately set with simple and easy adjustment of the control system even in case that the occupant restraint system is arranged to operate during a time period at which the integrated value of the deceleration is generally constant, thus reducing the number of adjustment operations for the control system.

DETAILED DESCRIPTION OF THE INVENTION

Figure 2:
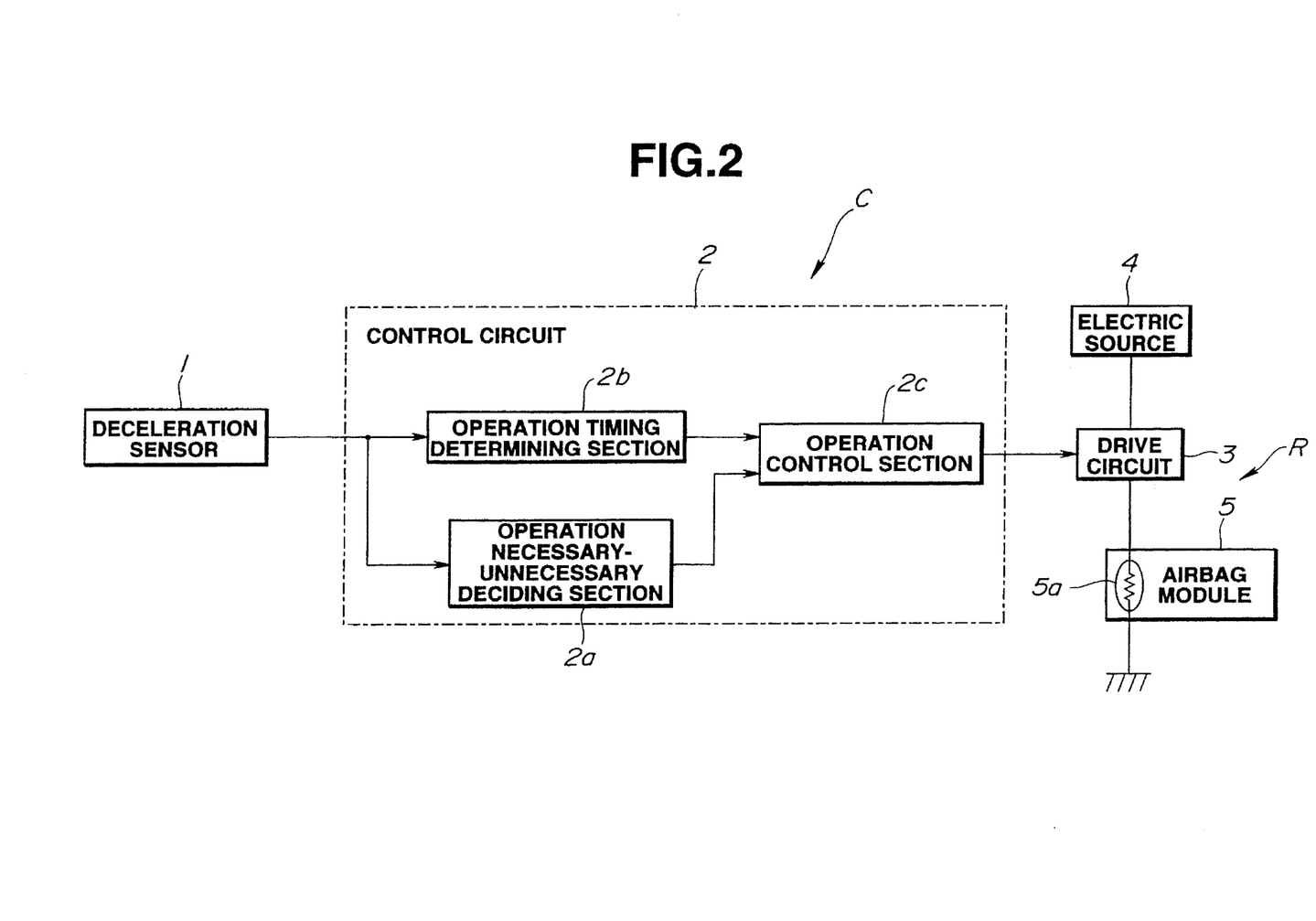
FIG. 2 is a block diagram of an embodiment of the control system for an occupant restraint system, according to the present invention.

Referring now to FIGS. 2 to 9, more specifically FIG. 2, a preferred embodiment of a control system of the present invention is illustrated by the reference character C and forms part of an occupant restraint system R for protecting a vehicle occupant(s) from coming into direct contact with a steering wheel, a windshield and/or the like (not shown) upon a vehicle collision or the like.

The control system C comprises a deceleration sensor 1 which is disposed, for example, at a floor tunnel section within a passenger compartment of an automotive vehicle (not shown), and adapted to detect a deceleration g of the automotive vehicle and output a signal representative of the deceleration g to a control circuit 2. The control circuit 2 includes a microcomputer and its peripherals though not shown, and is adapted to carry out control programs discussed after thereby controlling operation of the occupant restraint system R. The control circuit 2 includes an operation necessary-unnecessary deciding section 2a electrically connected to the deceleration sensor 1, an operation timing determining section 2b electrically connected to the deceleration sensor 1, and an operation control section 2c electrically connected to the sections 2a, 2b. The operation necessary-unnecessary deciding section is adapted to decide as to whether the operation of the occupant restraint system R is necessary or unnecessary. The operation timing deciding section 2b is adapted to determine an operation timing of the occupant restraint system R. The operation control section 2c is electrically connected to a drive circuit 3 forming part of the occupant restraint system R and adapted to output an operation command signal (commanding the operation of the occupant restraint system R) to the drive circuit 3 at the operation timing decided by the operation timing decision section 2b when a decision of the operation of the occupant restraint system R being necessary is made by the operation necessary-unnecessary decision section 2a.

The drive circuit 3 is electrically connected to an airbag module 5 forming part of the occupant restraint system R. In this embodiment, the airbag module 5 is stored in a central pad of a steering wheel of the automotive vehicle though not shown, so that the airbag module 5 protects a driver on a driver's seat. The airbag module 5 includes an airbag (not shown) which can inflate and develop to protect the driver from coming into direct contact with the steering wheel, the windshield and/or the like upon a vehicle collision or the like. The airbag module 5 further includes an inflator (not shown) for causing the airbag to inflate, and an electrical firing device or squib 5a for the inflator. The squib 5a is electrically connected to the drive circuit 3 which is electrically connected to an electric source or battery 5 so that electric current is suppliable from the electric source 4 to the squib 5a.

First, a method of deciding as to whether the occupant restraint system is necessary or unnecessary will be discussed with reference to FIGS. 3 and 4.

Figure 3:
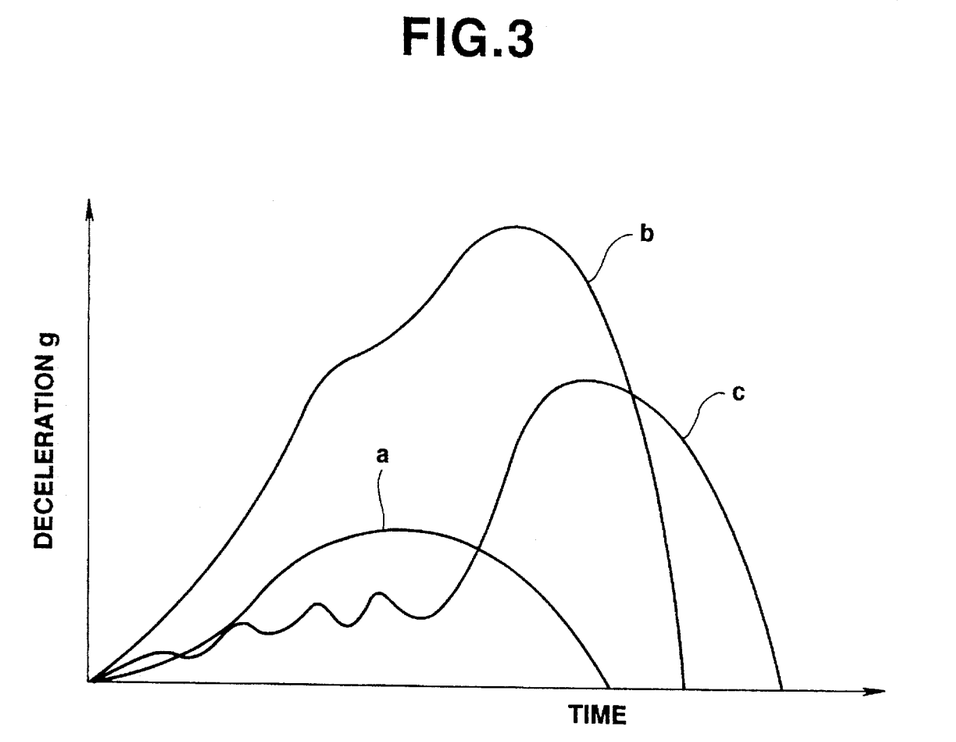
FIG. 3 is a graph showing a change in deceleration of a variety of vehicle collision modes, in terms of lapsed time.

FIG. 3 shows changes in deceleration g (after intiation of a vehicle collision) in three typical collision modes. One of the three modes is a light collision in which the deceleration g exhibits a characteristics indicated by a curve "a" similar to a sine curve having a low peak value. In case of such a light collision, it is unnecessary to operate the occupant restraint system R. Accordingly, such a collision is also called an "operation unnecessary collision". Another one of the three modes is a strong or serious collision in which the deceleration g exhibits a characteristics indicated by a curve "b" similar to a sine curve having a high peak value. In case of such a strong collision, the occupant restraint system R is required to be securely operated to protect the driver. A further one of the three modes is a collision in which the deceleration g exhibits such a characteristics as to be relatively low and vibratory at a time immediately after intiation of the collision but thereafter suddenly increase, as indicated by a curve "c" in FIG. 3. In case of such a collision, the occupant restraint system is required to be securely operated to protect the driver. Accordingly, such a collision is called a "low speed collision".

Now, both the light collision "a" and the low speed collision "c" exhibit low values in deceleration g for a while after initiation of the collision, and therefore it is difficult to accurately distinguish them from each other only in accordance with the decelerations g. In view of this, a variance Bu of deceleration g showing a deceleration condition of each collision mode is calculated by the following equation (1):

$$Bu = \Sigma\{g(n)-L\}/N \quad (1)$$

where $g(n)$ is a deceleration which is repeatedly detected, in which $n=1$ to $N$; $N$ is the number of samples (or sampling) of the detected deceleration g; $\Sigma$ is a sum obtained from $n=1$ to $n=N$; and L is a mean value of $g(n)$.

Figure 4:
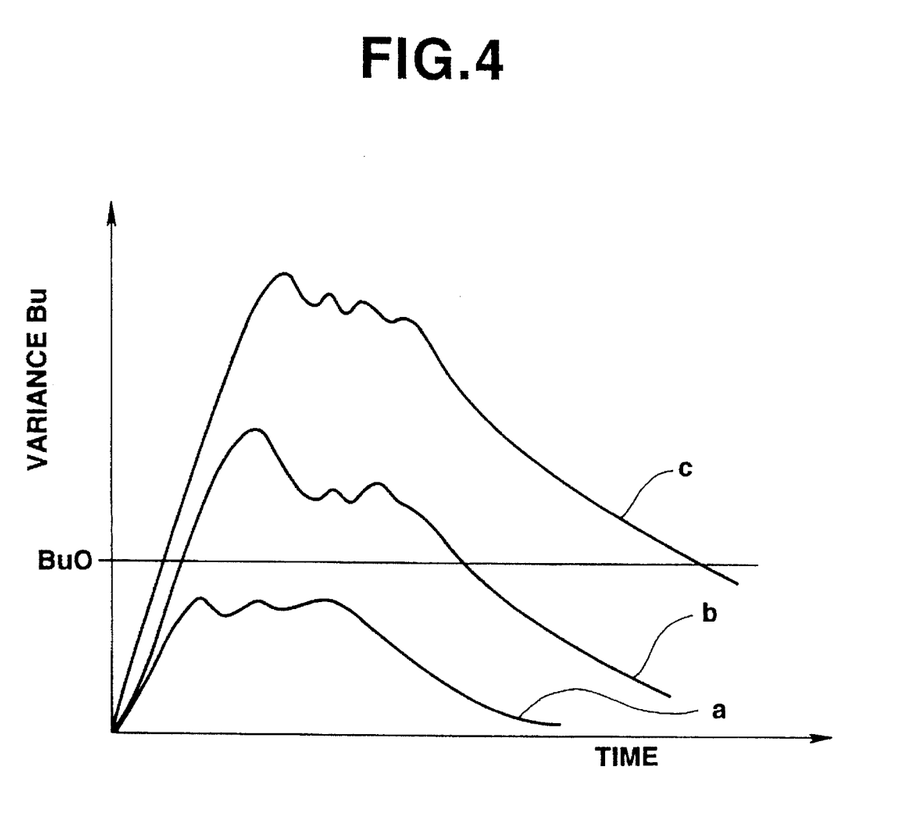
FIG. 4 is a change in variance of the vehicle collision modes in FIG. 3.

FIG. 4 shows the variance Bu of each of collisions a, b and c in FIG. 3. In case of the low speed collision c, a variation in deceleration g is considerably large at the initial stage of the collision as shown in FIG. 3, and therefore the variance Bu becomes large. In case of the light collision a, the variation in deceleration g is relatively small thereby minimizing the variance Bu. In case of the high speed collision b, the deceleration g is large as compared with the above two collisions and exhibits a large value in variance Bu. As apparent from FIG. 4, the high and low speed collisions b, c requiring the operation of the occupant restraint system R can be accurately and clearly distinguished from the light collision which does not require the operation of the same. In this connection, a threshold value BuO in the variance Bu is set, in which the operation of the occupant restraint system R is decided when the variance Bu exceeds the threshold value BuO.

Figure 5:
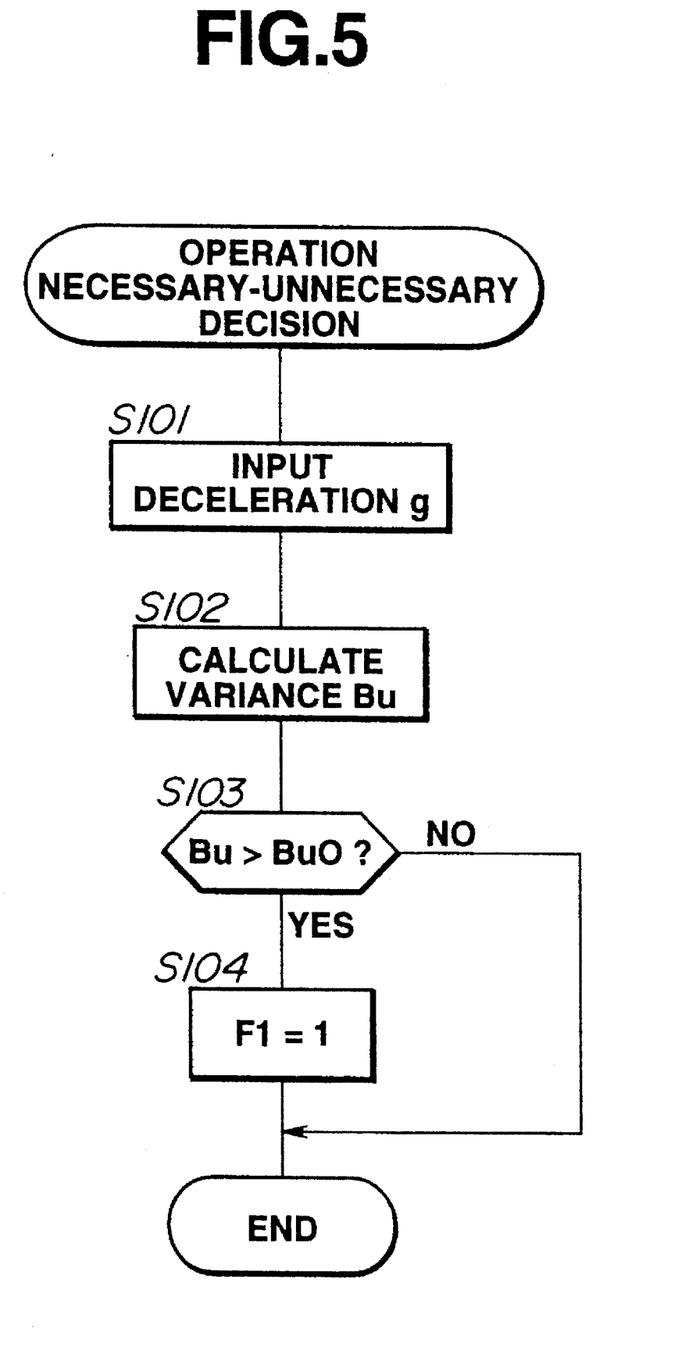
FIG. 5 is a flowchart showing a control program for deciding as to whether operation of the occupant restraint system is necessary or unnecessary.

FIG. 5 shows a control program for accomplishing a decision as to whether the operation of the occupant restraint system R is necessary or unnecessary. The operation necessary-unnecessary deciding section 2a of the control circuit 2 operates according to the flow chart of this control program.

The microcomputer makes the execution of the control program of FIG. 5, for example, every 0.5 msec. At a step S101, a signal representative of the deceleration g is input to the microcomputer from the deceleration sensor 1. At a step S102, the variance Bu is calculated in accordance with the detected deceleration g, by using the above equation (1). At a step S103, a decision is made as to whether the variance Bu exceeds the set threshold value BuO or not. In case that the variance Bu exceeds the threshold value BuO, a flow goes to a step S104 at which "1" is set at an operation necessary-unnecessary flag F1. In case that the variance Bu is not higher than the threshold value BuO, the execution of the control program of FIG. 5 is terminated. The operation control section 2c judges that the operation of the occupant restraint system R is decided to be necessary or to be made in case that "1" is set at the operation necessary-unnecessary flag F1. In other words, "1" at the flag F1 represents that a decision of operation of the occupant restraint system has been made.

Figure 6:
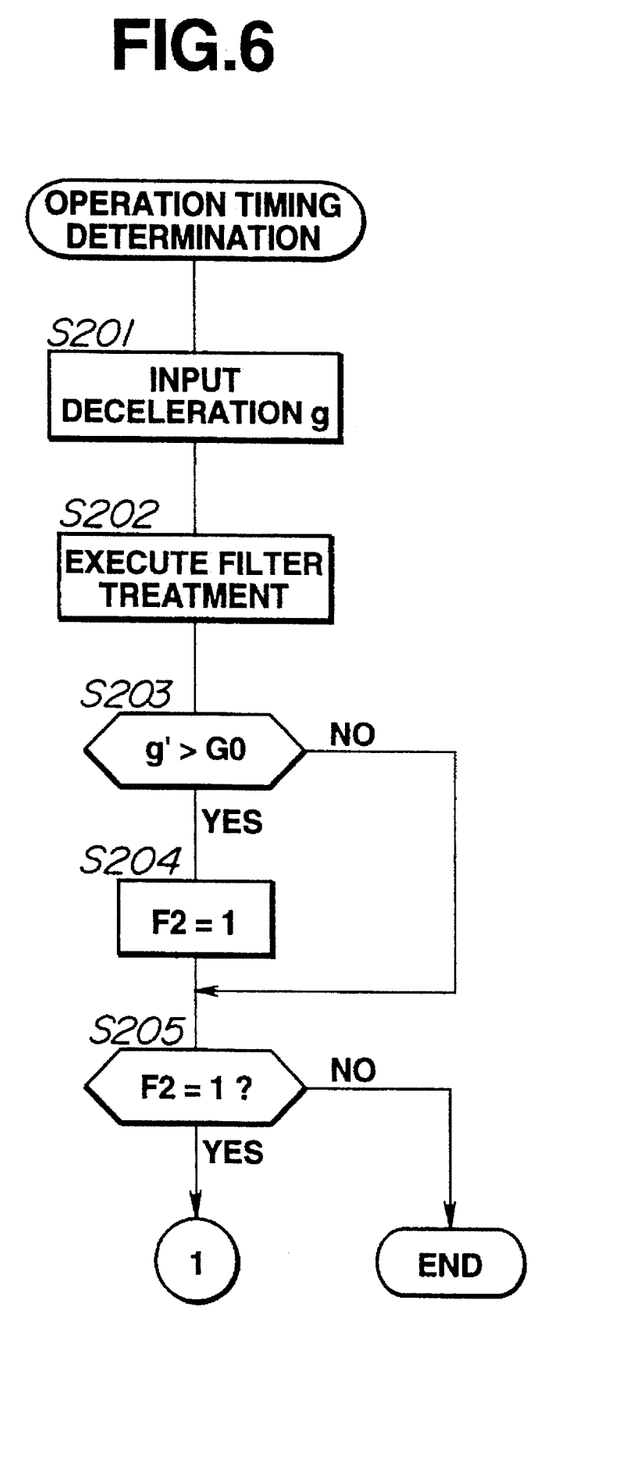
FIG. 6 is a part of a flowchart showing a flowchart showing a control program for determining an operation timing of the occupant restraint system.
Figure 7:
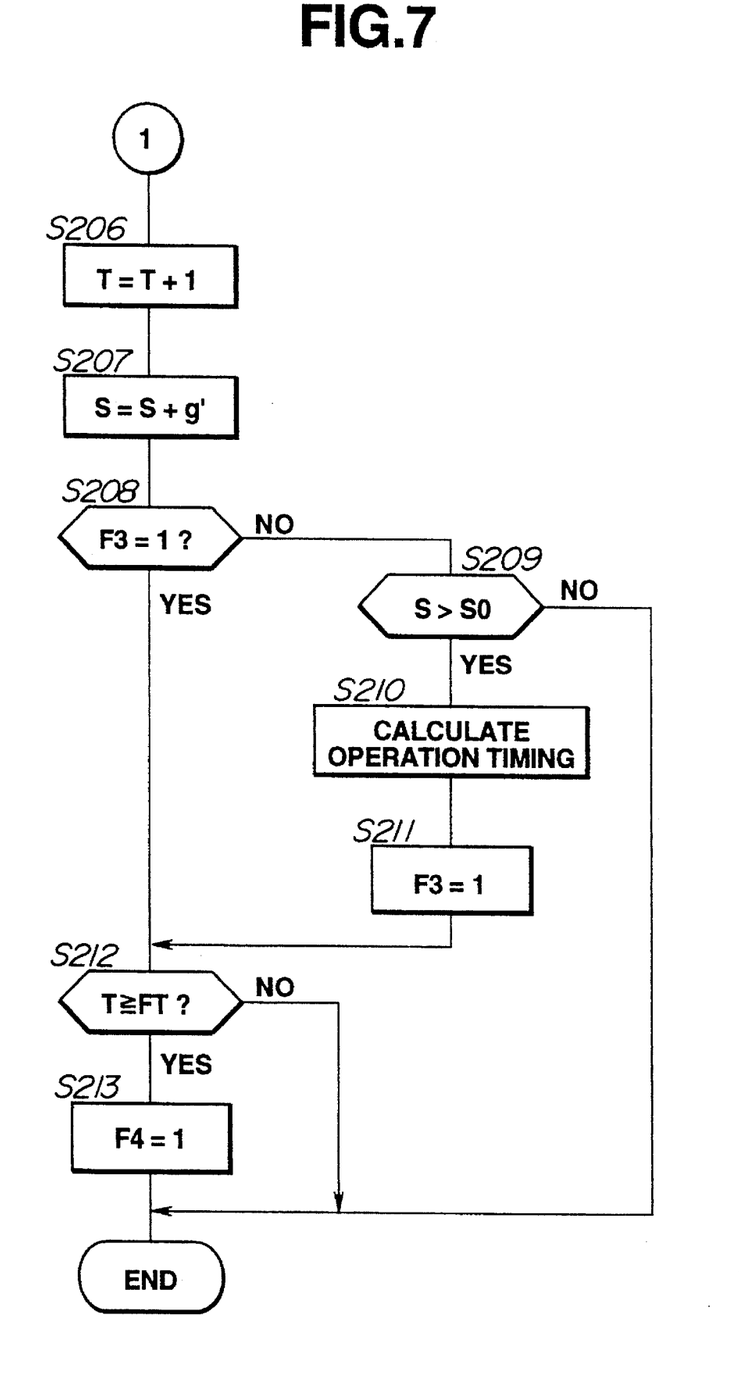
FIG. 7 is another part of the flowchart of FIG. 6.

FIGS. 6 and 7 show a control program for determining the operation timing of the occupant restraint system R. The operation timing determining section 2b of the control circuit 2 operates according to the flowchart of this control program.

The microcomputer makes the execution of this control program, for example, every 0.5 msec. At a step S201, the signal representative of the deceleration g is input to the microcomputer from the deceleration sensor 1. At a step S202, the deceleration (g) signal is subject to a low pass filter treatment to remove unnecessary high frequency components contained in the deceleration signal thereby obtaining a signal representative of a deceleration g'. At a step S203, a decision is made as to whether the deceleration g' exceeds a previously set threshold value G0 or not. In case that the deceleration g' is larger than the threshold value G0, a flow goes to a step S204. In case that the deceleration g' is not larger than the value G0, the flow goes to a step S205 bypassing the step S204. It will be understood that the threshold value G0 is used to distinguish a vehicle collision from normal vehicle movements, and therefore it is set as an optimum value under experiments. At the step S204, "1" is set at a collision anticipation flag F2 showing a high possibility of occurrence of a vehicle collision.

At the step S205, a decision is made as to whether "1" is set at the collision anticipation flag F2 or not. In case that "1" is set at the flag F2, an operation timing calculation program at or downstream of a step S206 will be executed. In case that "1" is not set at the flag F2, the execution of the program is terminated. In other words, in case that the deceleration g' has once exceeded the threshold value G0, the execution of the operation timing calculation program is continued even if the deceleration g' is thereafter lowered to or below the threshold value G0, thus preventing unstable execution of the calculation program due to variation of the deceleration g'.

In case that the possibility of vehicle collision occurrence is high upon "1" being set at the collision anticipation flag F2, an increment of time T is made in a timer (not shown) at a step S206 in FIG. 7. This timer is adapted to time a lapsed time from a timing at which the deceleration g' has exceeded the threshold value G0. At a step S207, the deceleration g' is integrated to obtain an integrated value S. The integrated value S is obtained by integrating the decelerations g' each of which is detected every execution of this control program from the timing at which the deceleration g' has exceeded the threshold value G0.

At a step S208, a decision is made as to whether "1" is set at an operation timing calculation flag F3 or not. The setting of "1" represents that the operation timing of the occupant restraint system R has been calculated. In case that "1" is set at the flag F3, the flow goes to a step S212 since calculation of the operation timing is unnecessary. In case that "1" is not set at the flag F3, the flow goes to a step S209 at which calculation of the operation timing is made. At the step S209, a decision is made as to whether the integrated value S exceeds a previously set threshold value S0. In case that the integrated value S exceeds the threshold value S0, the flow goes to a step S210. In case that the integrated value S is not higher than the threshold value S0, the execution of this control program is terminated.

Figure 8:
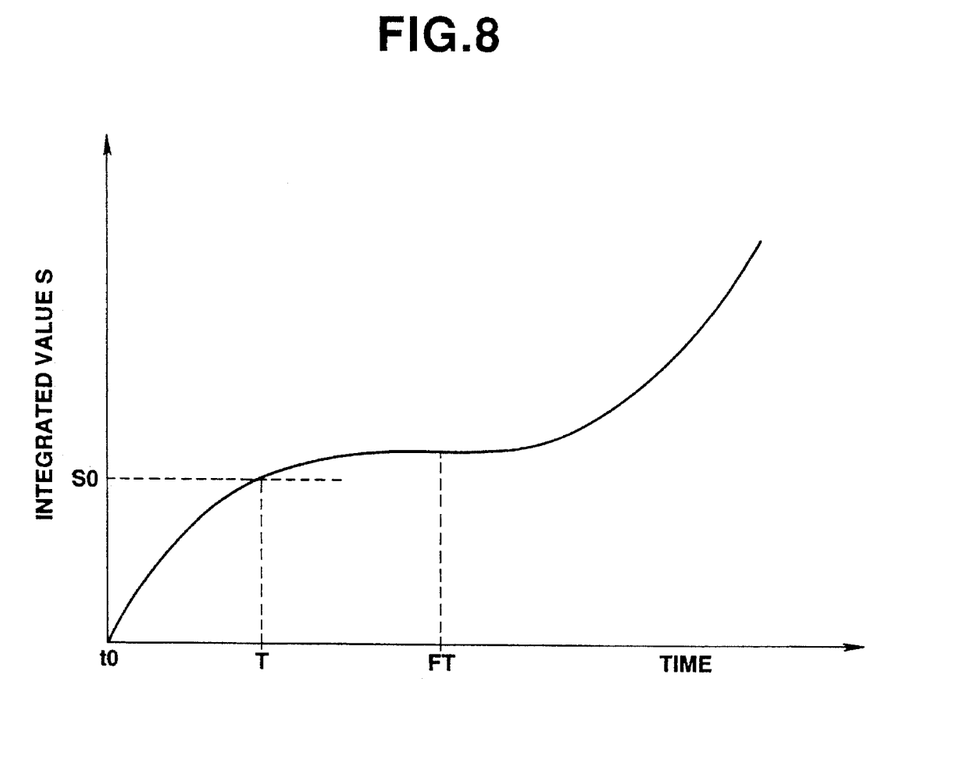
FIG. 8 is a graph illustrating the calculation of the operation timing of the occupant restraint system.

At a step S210, the operation timing FT of the occupant restraint system R is calculated. As shown in FIG. 8, the operation timing FT is calculated by the following equation (2), in which the starting point t0 for the operation timing FT is a timing at which the deceleration g' has exceeded the threshold value G0:

$$FT = T \times C1 + \text{offset} \quad (2)$$

where T is a time or time duration (timed by the timer) from the timing t0 to the present time; and C1 and offset are respectively constants decided by experiment or the like. When the operation timing FT has been calculated, the flow goes to a step S211 at which "1" is set at the operation timing calculation flag F3.

At a step S212, a decision is made as to whether the time T has reached the operation timing FT of the occupant restraint system R. In case that the the time T has reached the operation timing FT, the flow goes to a step S213 at which "1" is set at an operation timing flag F4, indicating the operation timing of the occupant restraint system has come or been reached. Then, the execution of the control program is terminated.

Figure 9:
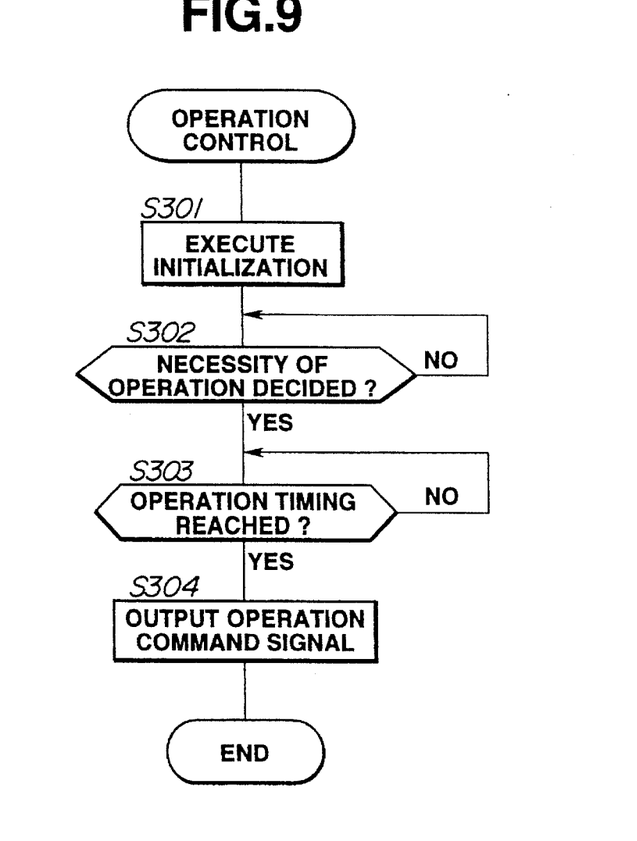
FIG. 9 is a flowchart showing a control program for operating the occupant restraint system.

FIG. 9 shows a control program of operational control of the occupant restraint system R. The operation control section 2c of the control circuit 2 operates according to the flowchart of this control program.

The microcomputer initiates the execution for this control program when an ignition key or switch (not shown) is switched ON. After initiation of the execution of this program, at a step S301, an initialization is made in which the time T (timed by the timer), set values at the flags F1 to F4 and the likes are set at the respective initial values. At a step S302, a decision is made as to whether the decision of operation of the occupant restraint system R is made or not according to setting of "1" or not at the operation necessary-unnecessary flag F1 provided from the operation necessary-unnecessary decision section 2a. In case that the operation has been decided to be made, a flow goes to a step S303. At the step S303, a decision is made as to whether "1" is set at the operation timing flag F4 according to setting of the operation timing decision section 2b, in which a stand-by is made until "1" is set at the flag F4. When "1" is set at the operation timing flag F4 so that the operation timing FT has been reached, the flow goes to a step S304 at which the operation command signal is output from the operation control section 2c to the drive circuit 3 to operate the airbag module 5. Upon receiving the operation command signal, the drive circuit 3 causes electric current to flow from the electric source 4 to the squib 5a. Thus, the squib 5a ignites the inflator thereby momentarily inflating the airbag of the airbag module 5.

While the operation timing FT of the occupant restraint system R has been shown and described as being calculated according to the equation (2) and in accordance with the time (duration) T from the timing at which the deceleration g' of the vehicle exceeds its threshold value to the timing at which the integrated value of the deceleration exceeds the threshold value in the above-discussed embodiment, it will be understood that the operation timing FT may be memorized as a tabulated data (an operation timing table) in the memory in the microcomputer upon determining the operation timings FT respectively corresponding to a variety of the times T or upon determining optimum values of the operation timing FT through experiments, in which a search is made on the operation timing table in the memory to read the operation timing FT according to the time T at the timing at which the integrated value of the deceleration exceeds the threshold value.

It will be appreciated that the method of deciding as to whether operation of the occupant restraint system is necessary or unnecessary may not be limited to that of the above-discussed embodiment.

Although only the occupant restraint system R including the airbag for the driver has been shown and described as being controlled by the control system C of the present invention, it will be understood that the principle of the present invention may be applicable to other occupant restraint systems including airbag and/or seat belt and to those systems for protecting vehicle occupants on a front seat aside the driver's seat and on a rear seat.

What is claimed is:

1. A control system for an occupant restraint system on a vehicle, comprising:

means for detecting a deceleration of the vehicle;

means for initiating integration of the deceleration to obtain an integrated value when the deceleration exceeds a predetermined first threshold value;

timing means for determining a time difference between a first point of time at which integration of the deceleration is initiated to a second point of time at which the integrated value of the deceleration exceeds a second threshold value;

means for determining an operation timing of the occupant restraint system in accordance with the time difference determined by said timing means;

means for deciding necessity of operation of the occupant restraint system in accordance with the deceleration detected by said deceleration detecting means; and means for operating the occupant restraint system at the operation timing determined by said operation timing determining means in response to the necessity of operation decided by said necessity deciding means.

2. A control system as claimed in claim 1, wherein said necessity deciding means includes means for deciding necessity of operation of the occupant restraint system in accordance with a variance of the deceleration.

3. A control system as claimed in claim 1, wherein said necessity deciding means is adapted to decide necessity of operation of the occupant restraint system when the variance of the deceleration exceeds a predetermined threshold level.

4. A control system as claimed in claim 1, further comprising means for continuing the integration of the deceleration to obtain the integrated value if the deceleration has once exceeded the predetermined threshold value.

5. A control system as claimed in claim 1, wherein said occupant restraint system is an airbag module including an airbag.

6. A control system as claimed in claim 1, wherein said occupant restraint system operating means includes means for momentarily inflating said airbag in response to the necessity of operation decided by said necessity deciding means.

7. A control system as claimed in claim 1, wherein said timing means comprises a timer for detecting a time difference from a first time $t0$, at which the deceleration exceeds said predetermined first threshold value $G0$, to a second time $T$, at which the integrated value of deceleration exceeds said second threshold value $S0$.

* * * * *